United States Patent
Selli

(10) Patent No.: US 6,804,993 B2
(45) Date of Patent: Oct. 19, 2004

(54) SENSOR ARRANGEMENTS AND METHODS OF DETERMINING A CHARACTERISTIC OF A SAMPLE FLUID USING SUCH SENSOR ARRANGEMENTS

(75) Inventor: Basilio Selli, Nesconset, NY (US)

(73) Assignee: Smar Research Corporation, Holbrook, NY (US)

( * ) Notice: Subject to any disclaimer, the term of this patent is extended or adjusted under 35 U.S.C. 154(b) by 0 days.

(21) Appl. No.: 10/314,803

(22) Filed: Dec. 9, 2002

(65) Prior Publication Data

US 2004/0107768 A1 Jun. 10, 2004

(51) Int. Cl.⁷ .............................. G01N 7/00; G01L 9/00; G06F 15/00
(52) U.S. Cl. ..................... 73/61.78; 73/723; 702/138
(58) Field of Search ............................ 73/61.78, 723, 73/717, 718, 756, 61.47, 61.76, 64.46, 713; 702/138

(56) References Cited

U.S. PATENT DOCUMENTS

| | | | |
|---|---|---|---|
| 5,495,769 A | 3/1996 | Broden et al. | |
| 5,606,513 A | * 2/1997 | Louwagie et al. | .......... 702/138 |
| 5,870,695 A | 2/1999 | Brown et al. | |
| 5,899,962 A | 5/1999 | Louwagie et al. | |
| 6,170,338 B1 | 1/2001 | Kleven et al. | |
| 6,397,114 B1 | 5/2002 | Eryurek et al. | |

* cited by examiner

Primary Examiner—Hezron Williams
Assistant Examiner—Katina M. Wilson
(74) Attorney, Agent, or Firm—Baker Botts LLP

(57) ABSTRACT

An arrangement and method for determining one or more characteristics of a sample fluid, and a method to determine the one or more characteristic of the sample fluid, are provided. In particular, a first assembly is contained within a particular housing, and a second assembly is positioned externally from the particular housing. The first assembly includes a first sensor which may be adapted to obtain first data associated with a first characteristic of the sample fluid, and a particular electrical assembly which is electrically coupled to the first sensor, and may be adapted to determine the first characteristic of the sample fluid as a function of the first data. The second assembly includes a second sensor which may be adapted to obtain second data associated with a second characteristic of the sample fluid. Moreover, the second sensor can be electrically coupled to the particular electrical assembly, and the particular electrical assembly is further adapted to determine the second characteristic of the sample fluid as a function of the second data.

22 Claims, 4 Drawing Sheets

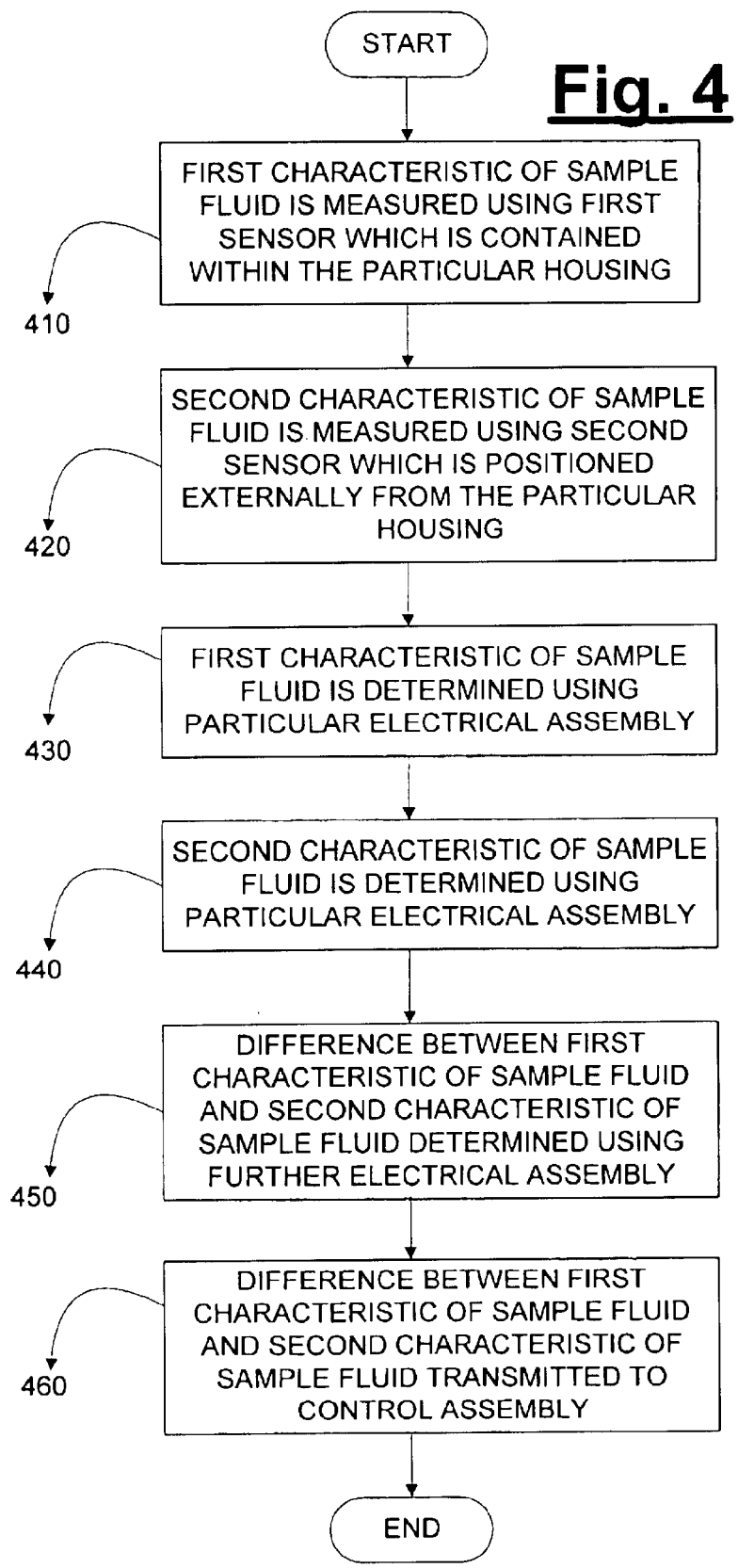

US 6,804,993 B2

SENSOR ARRANGEMENTS AND METHODS OF DETERMINING A CHARACTERISTIC OF A SAMPLE FLUID USING SUCH SENSOR ARRANGEMENTS

FIELD OF THE INVENTION

The present invention relates generally to an arrangement adapted to determine one or more characteristics of a sample fluid, and a method of determining one or more characteristic of the sample fluid using such arrangement. In particular, the present invention is directed to an arrangement in which a first sensor contained in a particular housing and a second sensor positioned externally from the particular housing are connected to the same electronics assembly which is adapted to determine a first characteristic of the sample fluid based on data obtained or measurements taken by the first sensor, and a second characteristic of the sample fluid based on data obtained or measurements taken by the second sensor.

BACKGROUND OF THE INVENTION

Conventional arrangements (e.g., sensor arrangements) may be used to determine one or more characteristic of a sample fluid within a container (e.g., a tank, a pipe, etc.). For example, the conventional arrangements can be used to determine a pressure associated with the sample fluid, a temperature of the sample fluid, a density of the sample fluid, etc. Such arrangement is described in U.S. Pat. No. 5,870,695, the entire disclosure of which of which is incorporated herein by reference, which includes a master pressure transmitter contained within a first housing, and a slave pressure transmitter positioned externally from the master pressure transmitter. The master pressure transmitter and the slave pressure transmitter determine a first pressure of a sample fluid in a container and a second pressure of the sample fluid, respectively.

Specifically, the master pressure transmitter of this publication includes a first transducer, a first circuit, a second circuit and a communication port. The slave pressure transmitter includes a second transducer and a third circuit. The first transducer is connected to the first circuit, and the second transducer is connected to the third circuit. According to the disclosure of this publication, the first circuit determines the first pressure of the sample fluid measured by the first transducer, and the third circuit determines second pressure of the sample fluid measured by the second transducer. Moreover, the first circuit and the third circuit are connected to the second circuit, and the second circuit determines a difference between the first pressure of the sample fluid and the second pressure of the sample fluid. The second circuit is connected to the communication port, and the communication port is connected to a control unit. The control unit transmits signals to the master pressure transmitter based on the difference between the first pressure of the sample fluid and the second pressure of the sample fluid.

Nevertheless, in such conventional arrangement, because the first transducer and the second transducer are connected to different circuits which determine the pressure of the sample fluid that is measured by the first transducer and the second transducer, respectively, the wiring arrangement of the conventional arrangement may be complicated, and difficult to service.

SUMMARY OF THE INVENTION

Therefore, a need has arisen to provide an arrangement and method for determining one or more characteristics of a sample fluid which overcome the above-described and other short comings of the related art.

One of the advantages of the present invention is that a first sensor contained within a particular housing and a second sensor positioned externally from the particular housing may be electrically coupled to the same electronics assembly which is adapted to determine one or more characteristics of a sample fluid that is measured by the first sensor and the second sensor, respectively. Consequently, a wiring arrangement used in the arrangement of the present invention may be less complicated than the wiring arrangement utilized in conventional arrangements. Another advantage of the present invention is that due to the second sensor being positioned externally from the particular housing, it is not necessary to disassemble the particular housing so as to repair the second sensor.

These and other advantages can be realized with an exemplary embodiment of an arrangement and method according to the present invention which determine one or more characteristics of a sample fluid. For example, a first assembly (e.g., a first sensor assembly) may be contained within the particular housing, and a second assembly (e.g., a second sensor assembly) may be positioned externally from such housing. In one exemplary implementation, the second assembly can be contained in another housing. The first assembly can include a first sensor (e., a first pressure sensor, a first temperature sensor, a first density sensor, etc.) which may be adapted to obtain first data associated with a first characteristic (e.g., a first pressure, a first temperature, a first density, etc.) of the sample fluid. The first assembly can also include a particular electrical assembly which may be electrically coupled to the first sensor, and adapted to determine the first characteristic of the sample fluid as a function of the first data. In one exemplary embodiment of the present invention, the first sensor and/or the particular electrical assembly can be contained within the housing.

Further, the second assembly (e.g., second sensor assembly) can include a second sensor (e.g., a second pressure sensor, a second temperature sensor, a second density sensor, etc.) which may be adapted to obtain second data associated with a second characteristic (e.g., a second pressure, a second temperature, a second density, etc.) of the sample fluid. This second sensor can be electrically coupled to the particular electrical assembly, and such particular electrical assembly may be further adapted to determine the second characteristic of the sample fluid as a function of the second data. For example, the sample fluid can be inside a container (e.g., a tank, a pipe etc.). In addition, the first assembly can be affixed to the container at a first location, and the second assembly can be affixed to the container at a second location which is different than the first location.

In another exemplary embodiment of the present invention, the first assembly can also include a further electrical assembly which may be electrically coupled to the second electrical assembly. The further electrical assembly may be adapted to determine a difference between the first characteristic of the sample fluid and the second characteristic of the sample fluid. Moreover, the first assembly can further include a transmission assembly which may be electrically coupled to the further electrical assembly, and can be adapted to transmit the difference between the first characteristic of the sample fluid and the second characteristic of the sample fluid to a control assembly which could utilize such difference to obtain further characteristics of the sample fluid.

BRIEF DESCRIPTION OF THE DRAWINGS

FIG. 4 is a flow diagram of an exemplary embodiment of a method according to the present invention for determining one or more characteristics of the sample fluid.

DETAILED DESCRIPTION

Exemplary embodiments of the present invention and their advantages may be understood by referring to FIGS. 1–4, like numerals being used for like corresponding parts in the various drawings.

Figure 1:
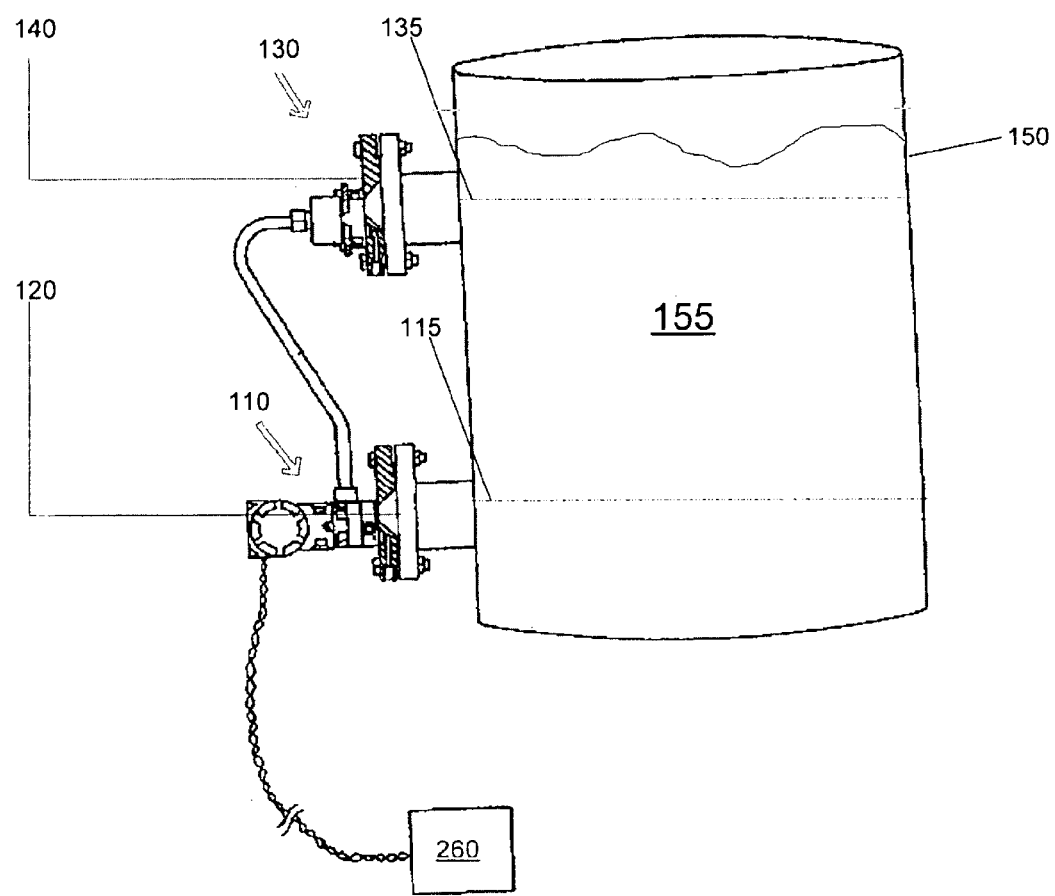
FIG. 1 is schematic diagram of an exemplary embodiment of an arrangement according to the present invention which is adapted to determine one or more characteristic of a sample fluid.

FIG. 1 shows an exemplary embodiment of an arrangement 100 (e.g., a sensor arrangement) adapted to determine one or more characteristic of a sample fluid 155. For example, the arrangement 100 may include a first assembly 110 (e.g., a first pressure sensor assembly, a first temperature sensor assembly, etc.) contained within a first housing 120, and a second assembly 130 positioned externally from the first assembly 110 and contained within a second housing 140. Each of the first assembly 110 and the second assembly 130 can be a second pressure sensor assembly, a second temperature sensor assembly, etc., and may be adapted to determine a characteristic (e.g., a pressure, a temperature, etc.) of the sample fluid 155. For example, the sample fluid 155 can be in a container 150, e.g., a tank, a pipe, etc., and the first assembly 110 and the second assembly 130 can both be affixed to the container 150 at a first location 115 and a second location 135, respectively. Moreover, the first assembly 110 may be adapted to determine a first characteristic of the sample fluid at the first location 115, and the second sensor assembly 130 may be adapted to determine a second characteristic of the sample fluid at the second location 135.

Figure 2:
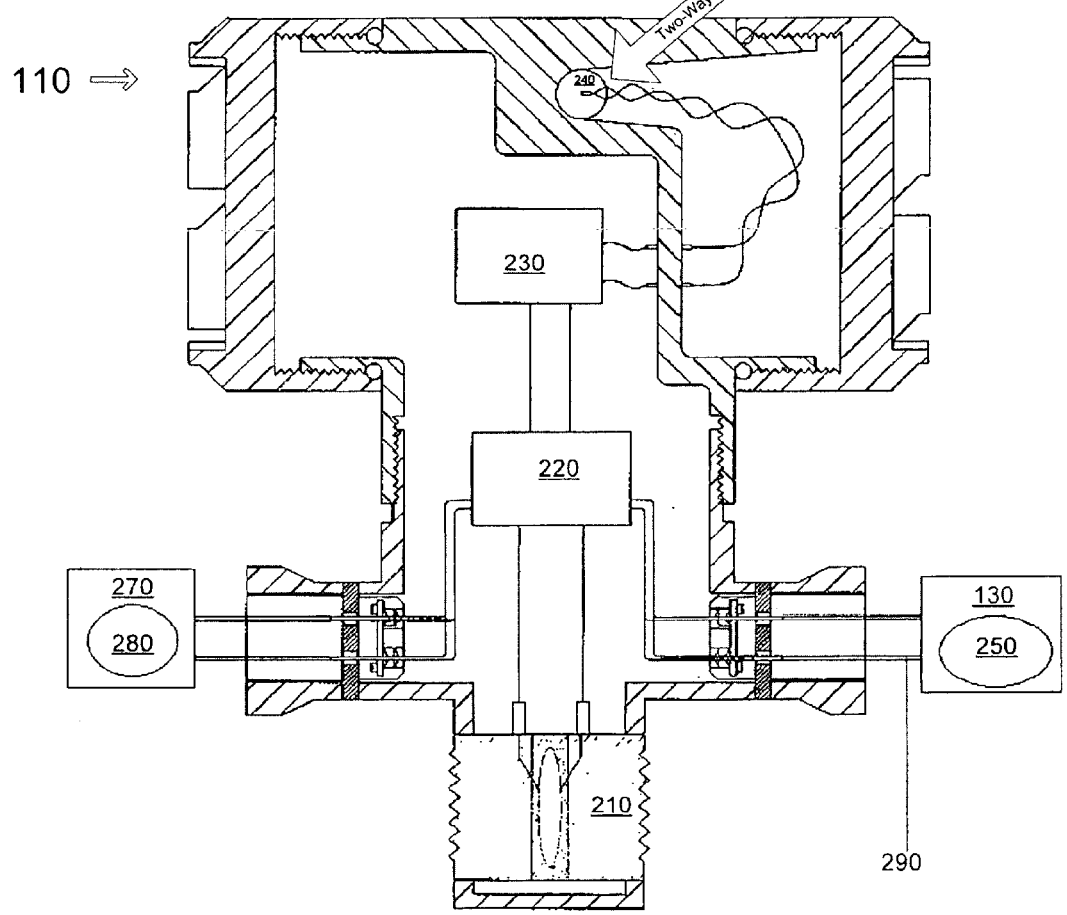
FIG. 2 is a cross-sectional view of an exemplary embodiment of an assembly of the arrangement shown in FIG. 1 according to the present invention for determining one or more characteristics of the fluid sample.
Figure 3:
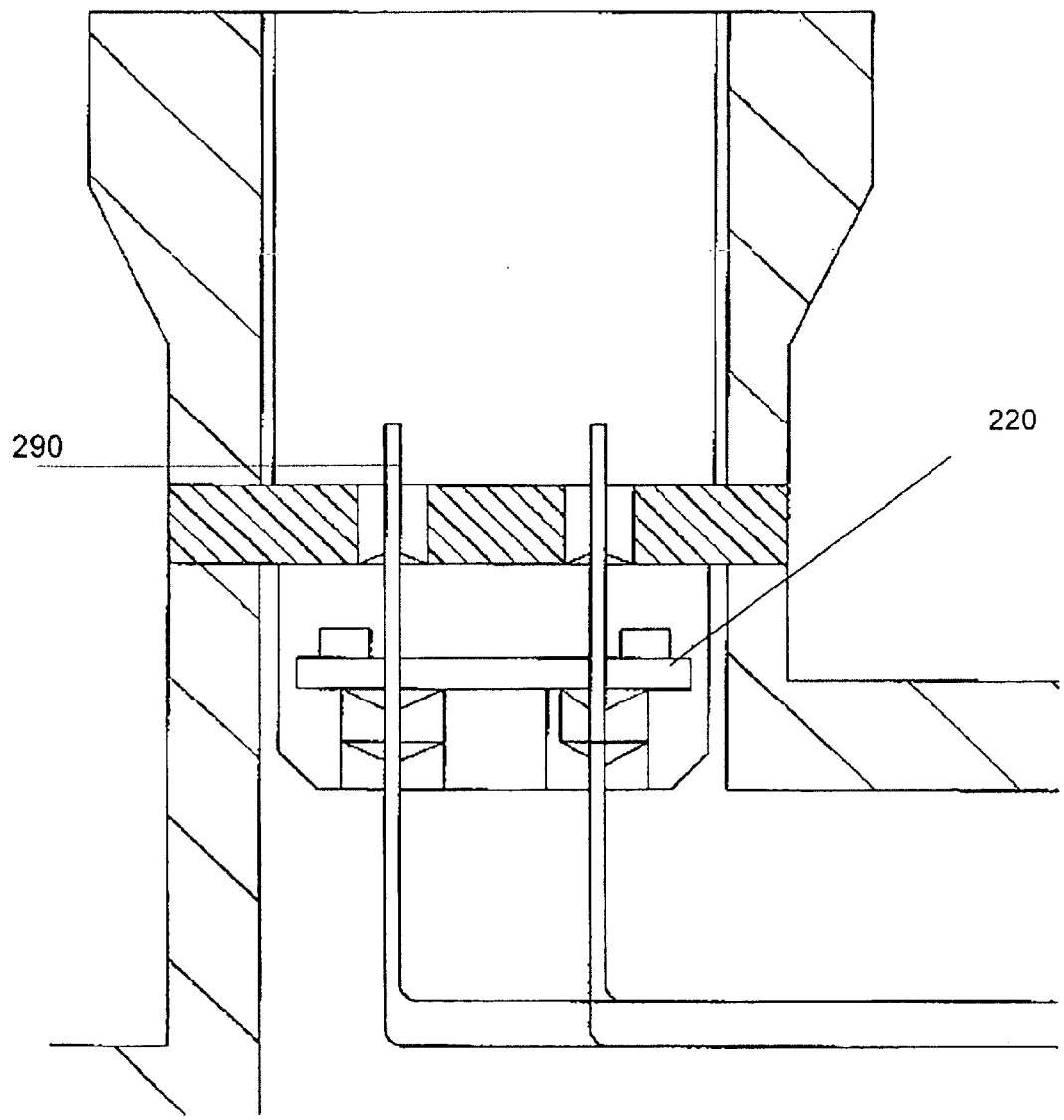
FIG. 3 is partial, expanded cross-sectional view of the assembly of FIG. 2.

In particular, referring to FIG. 2, the first assembly 110 can include a first sensor 210, a first electronics assembly 220, a second electronics assembly 230, and a transmission assembly 240. For example, the first housing 120 can be a control circuit board, and may contain the first sensor 210 and/or the first electronics assembly 220, and the first electronics assembly 220 can include a microprocessor (not shown for the sake of clarity). Moreover, the second assembly 130 may include a second sensor 250. The first sensor 210 and the second sensor 250 are each preferably electrically coupled to the first electronics assembly 220. For example, as shown in FIG. 3, the second sensor 250 can be electrically coupled to the first electronics assembly 220 via a cable 290. The first electronics assembly 220 may be adapted (e.g., using the microprocessor) to determine the first characteristic of the sample fluid based on the measurements obtained by the first sensor 210 (e.g., first differential pressure, first absolute pressure, a first temperature, etc.). The first electronics assembly 220 may also be adapted (again using the microprocessor) to determine the second characteristic of the sample fluid based on the measurements obtained by the second sensor 250. Moreover, the first electronics assembly 220 can be electrically coupled to the second electronics assembly 230. Using, for example, the microprocessor of the first electronics assembly 220, the second electronics assembly 230 may determine a difference between the first fluid characteristic and the second fluid characteristic (e.g., a pressure differential, a temperature differential, etc.). The second electronics assembly 230 may be electrically coupled to the transmission assembly 240, and the transmission assembly 240 can be in communication with a control assembly 260 e.g., using a Fieldbus network. The control assembly 260 may be adapted to transmit signals to the first assembly 110 based on and/or upon a determination of the difference between the first fluid characteristic and the second fluid characteristic by the second electronics assembly 230.

In another exemplary embodiment of the present invention, the arrangement 100 can further include a third assembly 270 which is adapted to measure at least one third characteristic of the sample fluid 155, and/or ascertain other characteristics of the environment or other factors affecting the sample fluid 155 or the tank 150 (e.g., the temperature of environment, the temperature of the sample fluid 155, etc.). For example, the third assembly 270 can include a third sensor 280 to effectuate such measurements, at the same time being positioned externally from the first housing 120. Moreover, the third sensor 280 is preferably electrically coupled to the first electronics assembly 220 and can forward signals and data thereto for providing additional information for the difference determination performed by the first electronics assembly 220.

For example the data forwarded to the first electronics assembly 220 by the third sensor 280 can effect the difference calculation, because, e.g., the temperature outside of the tank 150 can effect the accuracy of the readings by the first sensor 210 and the second sensor 220. Using such additional information obtained from the third sensor 280, it may be possible to compensate for any such environment conditions affecting the sensor readings.

Referring to FIG. 4, a flow diagram of an exemplary embodiment of a method according to the present invention for determining one or more characteristics of a sample fluid is depicted. In step 410, the first characteristic of the sample fluid 155 is measured using the first sensor 210 which is contained within the first housing 120. In step 420, the second characteristic of the sample fluid 155 is measured using the second sensor 250 which is positioned externally from the first housing 120. In step 430, the first characteristic of the sample fluid 155 is determined using the particular electrical assembly 220, and in step 440, the second characteristic of the sample fluid is determined using such particular electrical assembly 220. Moreover, in step 450, the difference between the first characteristic of the sample fluid 155 and the second characteristic of the sample fluid 155 may be determined by the further electrical assembly 230, and in step 460, the difference may be transmitted to the control assembly 260 which would determine the resultant characteristic of the sample fluid 155 in the tank based on this difference.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification and described examples are considered exemplary only, with the time scope and spirit of the invention indicated by the following claims.

What is claimed is:

1. An arrangement adapted to determine at least one characteristic of a sample fluid, comprising:

a first assembly contained within a particular housing, wherein the first assembly comprises:

a first sensor adapted to obtain first data associated with a first characteristic of the sample fluid; and a particular electrical assembly which is electrically coupled to the first sensor, wherein the particular electrical assembly comprises a particular processor; and a second assembly positioned externally from the particular housing, wherein the second assembly comprises a second sensor adapted to obtain second data associated with a second characteristic of the sample fluid, wherein the second sensor is electrically coupled to the particular processor of the particular electrical assembly, and wherein the particular processor is adapted to determine both the first characteristic of the sample fluid as a function of the first data, and the second characteristic of the sample fluid as a function of the second data.

2. The arrangement of claim 1, wherein the second assembly is contained within a further housing.

3. The arrangement of claim 1, wherein each of the first sensor and the second sensor are pressure sensors, wherein the first characteristic of the sample fluid is a first pressure of the sample fluid at a first location within a container, wherein the second characteristic of the sample fluid is a second pressure of the sample fluid at a second location within the container, and wherein the second location is different than the first location.

4. The arrangement of claim 3, wherein the first sensor is a differential pressure sensor, and the second sensor is an absolute pressure sensor.

5. The arrangement of claim 3, wherein the container is one of a tank and a pipe.

6. The arrangement of claim 1, wherein each of the first sensor and the second sensor are temperature sensors, wherein the first characteristic of the sample fluid is a first temperature of the sample fluid at a first location within a container, wherein the second characteristic of the sample fluid is a second temperature of the sample fluid at a second location within the container, and wherein the second location is different than the first location.

7. The arrangement of claim 1, further comprising a third assembly which is one of contained within the particular housing and positioned outside of the particular housing, wherein the third assembly comprises a third sensor which is electrically coupled to the particular electrical assembly.

8. The arrangement of claim 7, wherein each of the first sensor and the second sensor are pressure sensors, and wherein the third sensor is a temperature sensor.

9. The arrangement of claim 1, wherein the first assembly further comprises a further electrical assembly, wherein the further electrical assembly comprises a further processor that is electrically coupled to the second electrical assembly, and wherein the further processor is adapted to determine a third characteristic of the sample fluid based on the first characteristic of the sample fluid and the second characteristic of the sample fluid.

10. The arrangement of claim 9, wherein the third characteristic of the sample fluid is a difference between the first characteristic of the sample fluid and the second characteristic of the sample fluid, and wherein the first assembly further comprises a transmission assembly which is electrically coupled to the further electrical assembly, and capable of transmitting the third characteristic of the sample fluid to a control assembly.

11. The arrangement of claim 1, wherein each of the first sensor and the particular electrical assembly are contained within the particular housing.

12. The arrangement of claim 1, wherein the arrangement is a sensor arrangement, wherein the first assembly is a first sensor assembly, and wherein the second assembly is a second sensor assembly.

13. A method to determine at least one characteristic of a sample fluid, comprising the steps of:

obtaining first data associated with measuring a first characteristic of the sample fluid using a first sensor contained within a particular housing;

obtaining second data associated with a second characteristic of the sample fluid using a second sensor positioned externally from the particular housing;

determining the first characteristic of the sample fluid as a function of the first data using a particular processor of a particular electrical assembly, wherein the particular processor is electrically coupled to the first sensor; and determining the second characteristic of the sample fluid as a function of the second data using the particular processor of the particular electrical assembly, wherein the particular processor is electrically coupled to the first sensor.

14. The method of claim 13, wherein the second sensor is contained within a further housing.

15. The method of claim 13, wherein each of the first sensor and the second sensor are pressure sensors, wherein the first characteristic of the sample fluid is a first pressure of the sample fluid at a first location within a container, wherein the second characteristic of the sample fluid is a second pressure of the sample fluid at a second location within the container, and wherein the second location is different than the first location.

16. The method of claim 15, wherein the first sensor is a differential pressure sensor, and the second sensor is an absolute pressure sensor.

17. The method of claim 15, wherein the container is one of a tank and a pipe.

18. The method of claim 13, wherein each of the first sensor and the second sensor are temperature sensors, wherein the first characteristic of the sample fluid is a first temperature of the sample fluid at a first location within a container, wherein the second characteristic of the sample fluid is a second temperature of the sample fluid at a second location within the container, and wherein the second location is different than the first location.

19. The method of claim 13, further comprising the steps of:

obtaining third data associated with a third characteristic of the sample fluid using a third sensor which is one of contained within the particular housing, and positioned externally from the particular housing; and determining the third characteristic of the sample fluid as a function of the first characteristic of the sample fluid and the second characteristic of the sample using a further processor of a further electrical assembly.

20. The method of claim 19, wherein each of the first sensor and the second sensor are pressure sensors, and wherein the third sensor is a temperature sensor.

21. The method of claim 13, further comprising the step of determining a third characteristic of the sample fluid based on the first characteristic of the sample fluid and the second characteristic of the sample fluid using a further electrical assembly.

22. The method of claim 21, further comprising the step of transmitting the third characteristic of the sample fluid to a control assembly, wherein the third characteristic of the sample fluid is a difference between the first characteristic of the sample fluid and the second characteristic of the sample fluid.

* * * * *